Patented Aug. 14, 1945

2,382,262

UNITED STATES PATENT OFFICE 2,382,262

METHOD OF TREATING PIPE LINES

Lewis F. Scherer and Joseph A. South, Houston, Tex., assignors to The Texas Company, New York, N. Y., a corporation of Delaware No Drawing. Application November 18, 1941, Serial No. 419,583

7 Claims. (Cl. 252—173)

Our invention relates to the treatment of pipes which are subject to fouling with deposits of corrosion products or other scale, and especially to the treatment of pipe lines employed in the transportation of petroleum products.

Scale formation or deposition in pipes has long been a serious problem, especially in the case of pipes which are too long to permit cleaning by power-driven tools. Scrapers which are carried through pipes by the flow of liquid have been successful in removing soft materials, such as wax deposits in petroleum pipe lines; but such scrapers have been ineffective for the removal of hard scale. Up to the present time, no practical means has been devised for the effective removal of iron oxide and other hard scales from pipe lines, with the result that many lines are now operating at capacities considerably below their original clean pipe capacities.

We have now found that even very hard and adherent scales may be successfully removed from the interior of pipe lines, if the scale-encrusted surfaces are subjected to pretreatment with a colloid of the class known to prevent the deposition of hard water scale in boilers. This pretreatment with scale-peptizing colloids has the unexpected effect of softening hard deposits of iron oxide sufficiently to permit removal by means of a pipe line scraper having a rigid, close-fitting scraping element. Somewhat softer or less adherent scales, such as clay scales deposited from petroleum fractions which have previously been subjected to clay treating, are very easily removed by our colloid treating process, and are carried from the pipe in the form of a slurry, without requiring the use of scrapers. Our colloid treatment is especially advantageous for the cleaning of old pipe lines having scale deposits, but it is also useful as a preventive measure for maintaining lines free from scale.

Numerous organic colloids, such as gum arabic, gambir, tannin, starch, dextrin, gelatin, agar-agar, seaweed extracts, and the like, have been used for preventing the deposition of scale in boilers. ("Boiler Feed-Water Purification," Powell, McGraw Hill Book Co., N. Y. 1927, pp. 210–211; "The Prevention of Boiler Scale by Protective Colloids," J. Applied Chem. (U. S. S. R.) 10 2009, 1937). A number of colloids especially prepared for peptizing boiler scale are commercially available, and two of the most successful of these products are "Algor," which is prepared from seaweed, and "Sand-Banum," which is a suspension of natural resins, apparently composed principally of olibanum. Any of these colloids which may be successfully used for preventing the deposition of boiler scale may be used in our process for cleaning or treating pipe lines. However, we prefer to use colloids which carry a high colloidal charge, such as the oleo-resin and gum-resin suspensions described in U. S. Patent 1,557,349 of Josef Sichert, and especially the commercial material, "Sand-Banum," which is marketed by the American Sand-Banum Company, Inc., New York, N. Y.

The scale-peptizing colloid is applied to the interior of the pipe line in the form of a liquid suspension; and if it will remain as a colloidal suspension rather than form a true solution in the liquid being transported in a pipe line, it may suitably be suspended directly in such liquid. We prefer, however, to employ the colloid in an aqueous suspension; and, if a non-aqueous liquid is being transported in the line at the time of treatment, the colloid is preferably injected into the line in the form of an aqueous suspension The aqueous suspension may be transported through the line separately or admixed with the non-aqueous liquid which is being transported. In the latter case, the aqueous suspension may suitably be injected continuously into the non-aqueous liquid in amounts which may be less than or more than sufficient to exceed the solubility of water in the non-aqueous liquid, as desired.

The aqueous colloid suspension may be acidic, neutral, or alkaline in reaction, but a neutral or slightly alkaline suspension is generally more satisfactory, and we prefer to use the present commercially available form of "Sand-Banum," which is very satisfactory for use without any adjustment of its reaction. However, specially prepared or buffered suspensions of "Sand-Banum" or other scale-peptizing colloids, which are adjusted to neutrality or to a particular acid or alkaline reaction, may be employed if desired.

Only an extremely small amount of the scale peptizing colloid is necessary for successfully treating pipe lines in accordance with our present invention. Since there is no concentration of scale-forming constituents in pipe lines comparable to the concentration effected by evaporation in boilers, very much less colloid is required for pipe line treating than is necessary for successful boiler treating, when the amount of colloid in each case is based on the total metal surface area being treated, or is based on the total daily liquid through-put, i. e., the daily feed-water requirement of the boiler and the daily pumping schedule of the pipe line. On the other hand, if a pipe-line is treated during the transportation of a non-aqueous liquid, the amount of colloid used, based on daily through-put of water rather than total liquid throughput, may be very much greater than the amount of colloid used in boiler treating. In any case, the amount of colloid used is extremely small, being of the order of a few parts of colloid per hundred million parts of total liquid in the section of pipe line being treated. From one to ten parts per hundred million will usually be satisfactory, but even less may be sufficient in certain cases, especially for continuous preventive treatments rather than initial cleaning treatments. Since the preferred scale-peptizing colloids are completely inert, a large excess may be added without adverse effect, and the upper limit of treating concentration is thus determined solely by economic considerations.

Based on the area of pipe surface to be treated, the amount of colloid which should be used is also extremely small. Thus, when using a concentrated colloid suspension such as commercial "Sand-Banum," a daily volume dosage of from one to ten cubic units per billion square units of pipe area will usually be sufficient for cleaning even badly scaled pipe, and considerably smaller dosages may be sufficient for continuous preventive treatment of clean pipe.

For cleaning operations, the duration of the pre-treatment prior to the use of scrapers will depend on the amount, hardness, and adherence of the scale to be removed. Continuous treatment for from five to twenty-five days will usually be sufficient to enable satisfactory scraping of the line, and in most cases continuous pre-treatment for ten day will be adequate.

For preventive treatment of clean pipe, the pipe line may suitably be given a brief initial treatment with dosages comparable to those used for cleaning operations, to insure initial coating of the pipe surfaces with the colloid. Subsequently, the dosage may usually be reduced, for example, to amounts comparable to boiler-treating dosages based on water through-put. In any case, the adequacy of the treatment may be checked by periodic inspection of test sections of the line.

Our invention may be further illustrated by the following specific example:

A pipe line employed for the transportation of petroleum products, having a total length of 80.13 miles, and comprising 72.07 miles of 8" line and 8.06 miles of 10" line, was found to have decreased capacity due to the presence of clay scale and iron oxide scale. Standard pipe line scrapers, having resilient scraping elements, were passed through the line, but only a small amount of scale was removed, and test sections of the pipe were found to have scale of approximately 5.5 hardness (Moh's scale of hardness), which could not be removed with a pen-knife. The line was then subjected to treatment with a "Sand-Banum" suspension prepared by diluting commercial "Sand-Banum" with water in a ratio of 2 ounces of "Sand-Banum" to 15 gallons of water. This suspension was continuously injected into gasoline which was being transported in the line at the time of treatment. The gasoline had a water content of approximately 30 parts per million, and the diluted Sand-Banum suspension was injected at the rate of 21 parts per million parts of gasoline. This treatment was continued for ten days, after which the line was displaced with water, as a safety measure in view of the possibility of having to open the line during the scraping operations, and scrapers were then passed through the line. The scrapers in this case were modified by the addition of a rigid scraping element comprising a steel disk having a diameter ¼" less than the internal diameter of the pipe. As a result of the action of the Sand-Banum, this close-fitting, rigid scraper was able to pass through the line and remove the softened or loosened iron oxide scale. This scale was mechanically pushed through the line by the scrapers and was removed periodically at scraper traps, together with the clay scale which was thoroughly suspended in the water as a result of the peptizing action of the "Sand-Banum." A total of over 80,000 pounds of iron oxide scale was thus removed, together with an undetermined amount of clay scale.

It is to be understood, of course, that the above example is merely illustrative and does not limit the scope of our invention. As has been previously pointed out, other scale-peptizing colloids may be employed, and the treatment with such colloids may be used for preventive as well as for cleaning purposes. Similarly, our treating process may be used for pipe lines other than those employed for the transportation of petroleum products; and it is to be understood that the term "pipe line," as used herein and in the appended claims, signifies any pipe system used for the transportation of fluids which is too long or too inaccessible to permit cleaning by power-driven tools. It is also to be understood that the use of any equivalents or any modifications of procedure which would naturally occur to one skilled in the art is included in the scope of our invention. Only such limitations are to be imposed on the scope of our invention as are indicated in the appended claims.

We claim:

1. A process for treating the interior surface of a pipe line employed for the transportation of petroleum products, to facilitate the removal of any scale deposits therefrom and to reduce scale formation thereon, which comprises introducing into said pipe line, concurrently with a liquid petroleum product, an aqueous suspension of an organic hydrophilic colloid having the property of peptizing hard water boiler scale, the rate of introduction of said organic colloid being less than 10 parts per 100,000,000 parts of liquid introduced into said pipe line concurrently with said colloid.

2. A process for removing scale deposits from the interior surface of a pipe line employed for the transportation of petroleum products, which comprises introducing into said pipe line, concurrently with a liquid petroleum product, an aqueous suspension of an organic hydrophilic colloid having the property of peptizing hard water boiler scale, the rate of introduction of said organic colloid being less than 10 parts per 100,000,000 parts of liquid introduced into said pipe line concurrently with said colloid, whereby said scale deposits are softened and at least partially suspended in said liquid, and removing from said pipe line the resulting softened and suspended scale.

3. A process for treating the interior surface of a pipe line during the transportation of a liquid petroleum product, to facilitate the removal of any scale deposits therefrom and to reduce scale formation thereon, which comprises passing through said pipe line, concurrently with said liquid petroleum product, a liquid suspension of an organic hydrophilic colloid having the property of peptizing hard water boiler scale, in amounts less than ten parts per one hundred million parts of said liquid petroleum product passing through said pipe line.

4. A process for treating the interior surface of a pipe line during the transportation of a liquid petroleum product, to facilitate the removal of any scale deposits therefrom and to reduce scale formation thereon, which comprises passing through said pipe line, concurrently with said liquid petroleum product, an aqueous suspension of an organic hydrophilic colloid having the property of peptizing hard water boiler scale, in amounts less than ten parts per one hundred million parts of said liquid petroleum passing through said pipe line.

5. A process for treating the interior surface of a pipe line employed for the transportation of petroleum products, to facilitate the removal of scale deposits therefrom and to reduce scale formation thereon, which comprises introducing into said pipe line, concurrently with a liquid petroleum product, an aqueous suspension of an organic hydrophilic colloid comprising olibanum, and having the property of peptizing hard water boiler scale, the rate of introduction of said colloid being less than ten parts per one hundred million parts of liquid introduced into said pipe line concurrently with said colloid.

6. A process for removing scale deposits from the interior surface of a pipe line employed for the transportation of petroleum products, which comprises introducing into said pipe line, concurrently with a liquid petroleum product, a liquid suspension of an organic hydrophilic colloid having the property of peptizing hard water boiler scale at a rate of less than ten parts of said colloid per one hundred million parts of liquid introduced into said pipe line concurrently with said colloid, whereby said scale deposits are softened and at least partially suspended in said liquid, and removing from said pipe line the resulting softened and suspended scale.

7. A process for removing scale deposits from the interior surface of a pipe line employed for the transportation of petroleum products, which comprises introducing into said pipe line, concurrently with a liquid petroleum product, an aqueous suspension of olibanum, the rate of introduction of said suspension of olibanum being less than ten parts per one hundred million parts of liquid introduced into said pipe line concurrently with said colloid, and removing from said pipe line the resulting softened and suspended scale.

LEWIS F. SCHERER.
JOSEPH A. SOUTH.